United States Patent
Lee

(10) Patent No.: US 10,209,433 B2
(45) Date of Patent: Feb. 19, 2019

(54) BACKLIGHT MODULE AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventor: Sangjig Lee, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 38 days.

(21) Appl. No.: 15/511,376

(22) PCT Filed: Sep. 19, 2016

(86) PCT No.: PCT/CN2016/099308
§ 371 (c)(1),
(2) Date: Mar. 15, 2017

(87) PCT Pub. No.: WO2017/118094
PCT Pub. Date: Jul. 13, 2017

(65) Prior Publication Data
US 2018/0113252 A1   Apr. 26, 2018

(30) Foreign Application Priority Data

Jan. 5, 2016   (CN) .......................... 2016 1 0006894

(51) Int. Cl.
*F21V 8/00*     (2006.01)
*F21S 8/00*     (2006.01)
(Continued)

(52) U.S. Cl.
CPC .............. *G02B 6/0088* (2013.01); *F21S 8/00* (2013.01); *F21V 17/16* (2013.01); *G02B 6/00* (2013.01);
(Continued)

(58) Field of Classification Search
None
See application file for complete search history.

(56) References Cited

U.S. PATENT DOCUMENTS

2010/0128465 A1   5/2010   Byoun et al.
2012/0182482 A1   7/2012   Byoun et al.
(Continued)

FOREIGN PATENT DOCUMENTS

CN   1779520 A   5/2006
CN   1971376 A   5/2007
(Continued)

OTHER PUBLICATIONS

International Search Report and Written Opinion dated Dec. 19, 2016; PCT/CN2016/099308.
(Continued)

*Primary Examiner* — Elmito Breval
(74) *Attorney, Agent, or Firm* — Ladas & Parry LLP

(57) ABSTRACT

A backlight module and a display device are disclosed. The backlight module includes a light guide plate and a position limit structure. The position limit structure includes a support plate and an elastic position limit protrusion disposed on the support plate, the elastic position limit protrusion corresponds to a side surface of the light guide plate, and the elastic position limit protrusion generates elastic deformation along a direction perpendicular to the support plate upon being pressed by the side surface of the light guide plate.

16 Claims, 6 Drawing Sheets

(51) Int. Cl.
    *F21V 17/16*     (2006.01)
    *G02B 6/00*     (2006.01)
    *G02F 1/1335*     (2006.01)
    *G02F 1/1333*     (2006.01)

(52) U.S. Cl.
    CPC ...... *G02B 6/0051* (2013.01); *G02F 1/133615* (2013.01); *G02F 2001/133322* (2013.01); *G02F 2201/54* (2013.01)

(56) References Cited

U.S. PATENT DOCUMENTS

| | | |
|---|---|---|
| 2013/0300972 A1 | 11/2013 | Wu |
| 2014/0313773 A1 | 10/2014 | Wu et al. |
| 2016/0299287 A1 | 10/2016 | Li et al. |

FOREIGN PATENT DOCUMENTS

| | | |
|---|---|---|
| CN | 101865404 A | 10/2010 |
| CN | 201724080 U | 1/2011 |
| CN | 102654601 A | 9/2012 |
| CN | 202511121 U | 10/2012 |
| CN | 102777812 A | 11/2012 |
| CN | 202835045 U | 3/2013 |
| CN | 103216791 A | 7/2013 |
| CN | 203868211 U | 10/2014 |
| CN | 104180254 A | 12/2014 |
| CN | 104748017 A | 7/2015 |
| CN | 105066008 A | 11/2015 |
| CN | 105674145 A | 6/2016 |
| CN | 102635816 A | 8/2018 |
| JP | 2011-061411 A | 3/2011 |

OTHER PUBLICATIONS

The First Chinese Office Action dated Aug. 16, 2017; Appln. 201610006894.4.

BACKLIGHT MODULE AND DISPLAY DEVICE

TECHNICAL FIELD

The present disclosure relates to a backlight module and a display device.

BACKGROUND

A backlight module is one of the key subassemblies in a liquid crystal display panel. Generally, a backlight module includes a back plate, and a reflective sheet, a light guide plate and a diffusing layer which are disposed on the back plate. A backlight module can be provided with a liquid crystal cell including an array substrate, an opposed substrate and a liquid crystal layer sandwiched between the array substrate and the opposed substrate thereon. Thus, the backlight module can provide uniformly-distributed backlight with sufficient brightness to the liquid crystal cell.

As illustrated by FIG. 1 and FIG. 2, the structure of an ordinary backlight module includes a reflective layer 002, a light guide plate 003, a diffusing layer 004 and the like, which are sequentially disposed on a back plate 001. A backlight module can be further provided with a module frame 005 thereon. A display panel 009 is disposed on the module frame 005, and finally constitutes a rudiment of a display device together with an assembling frame 007 and the backlight module. In this structure, in order to conveniently assemble the relative components, a certain gap will be remained between different components (for example, a light guide plate 003 and a position limit structure 006); besides, with regard to a light guide plate which is sensitive to the surrounding changes such as temperature and humidity, in order to guarantee a certain reliability on the temperature and humidity, the width of the gap can be determined according to a predicted expansion amount in design.

SUMMARY

At least one embodiment of the present disclosure relates to a backlight module and display device, which can relieve the bending situation of a light guide plate in the backlight module.

At least one embodiment of the present disclosure provides a backlight module, including: a light guide plate and a position limit structure, the position limit structure includes a support plate and an elastic position limit protrusion disposed on the support plate, the elastic position limit protrusion corresponds to a side surface of the light guide plate, and the elastic position limit protrusion is configured to generate elastic deformation along a direction perpendicular to the support plate upon being subjected to a pressure from the side surface of the light guide plate.

For example, in the backlight module provided by an embodiment of the present disclosure, the side surface of the light guide plate is provided with a groove, the elastic position limit protrusion corresponds to the groove, and the elastic position protrusion is configured to generate the elastic deformation along a direction perpendicular to the support plate upon being subjected to the pressure from the groove.

For example, in the backlight module provided by an embodiment of the present disclosure, a top surface of the elastic position protrusion and a bottom surface of the groove contact with each other, and the side surface of the light guide plate and the support plate have a first distance therebetween upon the pressure that the elastic position limit protrusion is subjected to being smaller than a preset value; and the top surface of the elastic position limit protrusion and the bottom surface of the groove contact with each other, and the side surface of the light guide plate and the support plate have a second distance therebetween upon the pressure that the elastic position limit protrusion is subjected to being larger than or equal to the preset value, the second distance is smaller than the first distance.

For example, the backlight module provided by an embodiment of the present disclosure further includes a back plate, the light guide plate is disposed on the back plate, and the position limit structure is disposed at an edge of the back plate and corresponds to the side surface of the light guide plate.

For example, in the backlight module provided by an embodiment of the present disclosure, the back plate has a polygon shape, the position limit structure is disposed at least one edge of the back plate and corresponds to at least one side surface of the light guide plate.

For example, in the backlight module provided by an embodiment of the present disclosure, the support plate is connected to the back plate, the support plate is provided with a fixing element, configured to keep relative fixation of the elastic position limit protrusion and the back plate along a direction perpendicular to a direction of elastic deformation of the elastic position limit protrusion.

For example, in the backlight module provided by an embodiment of the present disclosure, the support plate and the back plate have an integrated structure.

For example, in the backlight module provided by an embodiment of the present disclosure, the elastic position limit protrusion includes a position limit element and an elastic element which are relatively fixed, the elastic element and the fixing element are relatively fixed along a direction perpendicular to a direction of elastic deformation of the elastic element.

For example, in the backlight module provided by an embodiment of the present disclosure, the elastic element is a spring, the position limit element includes a columnar body and a top surface, a diameter of the top surface is larger than an internal diameter of the spring, and the spring is sleeved on the columnar body.

For example, in the backlight module provided by an embodiment of the present disclosure, the fixing element is a columnar protrusion, an internal diameter of the columnar body is larger than an external diameter of the columnar protrusion, and the columnar body is sleeved on the columnar protrusion.

For example, in the backlight module provided by an embodiment of the present disclosure, a bottom surface of the columnar body and the support plate has a third distance therebetween upon the elastic position limit protrusion not being pressed, and the bottom surface of the columnar body and the support plate contact with each other upon the elastic position limit protrusion being pressed.

For example, the backlight module provided by an embodiment of the present disclosure further includes a detachable support element, the columnar protrusion has a hollow structure, a diameter of the detachable support element is smaller than the internal diameter of the columnar protrusion, the detachable support element is configured to fix the position limit element, so as to make the bottom surface of the columnar body and the support plate have a fourth distance therebetween upon being inserted in the columnar protrusion.

For example, in the backlight module provided by an embodiment of the present disclosure, the fourth distance includes zero.

For example, in the backlight module provided by an embodiment of the present disclosure, an internal top surface of the columnar body is provided with a fixing groove, an end of the detachable support element is fixed in the fixing groove, so as to make the top surface of the position limit element and the bottom surface of the groove have a fifth distance therebetween upon the detachable support element supporting the position limit element.

For example, in the backlight module provided by an embodiment of the present disclosure, the fifth distance includes zero.

For example, in the backlight module provided by an embodiment of the present disclosure, the detachable support element includes a screw, an internal wall of the columnar protrusion and/or the fixing groove is provided with a screw thread matching with the screw.

For example, in the backlight module provided by an embodiment of the present disclosure, a length of the elastic position limit protrusion is smaller than a length of the groove.

At least one embodiment of the present disclosure provides a display device, including any one of the abovementioned backlight module.

BRIEF DESCRIPTION OF THE DRAWINGS

In order to clearly illustrate the technical solution of the embodiments of the present disclosure, the drawings for describing the embodiments will be briefly described in the following; it is obvious that the described drawings are only related to some embodiments of the present disclosure, for one person skilled in the art, other drawings can be obtained according to these drawings without paying inventive labor.

DRAWING REFERENCES

Figure 1:
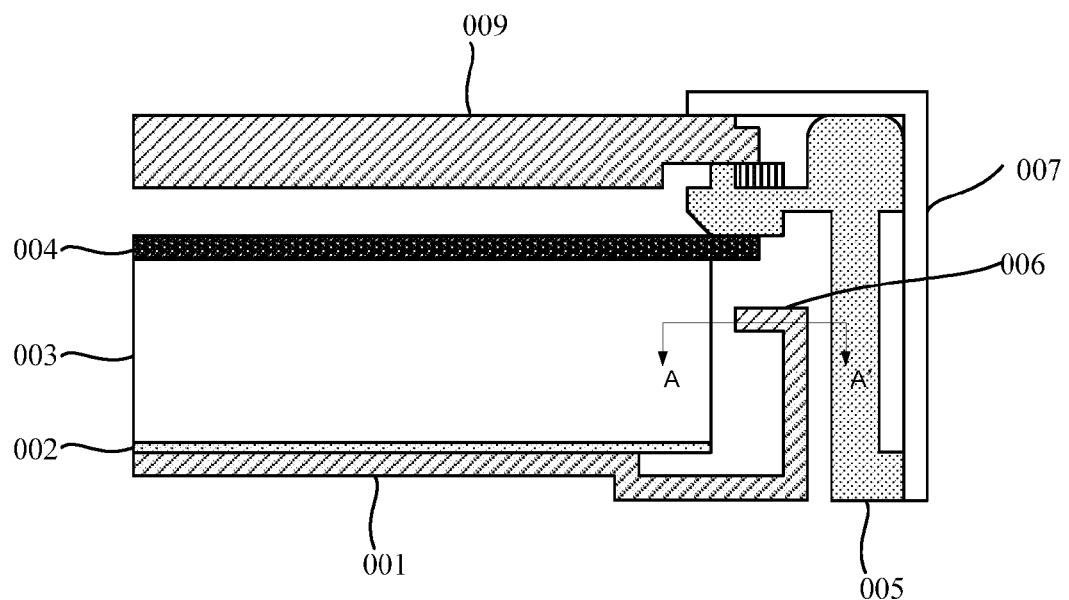
FIG. 1 is a structural schematic diagram of a backlight module.
Figure 2:
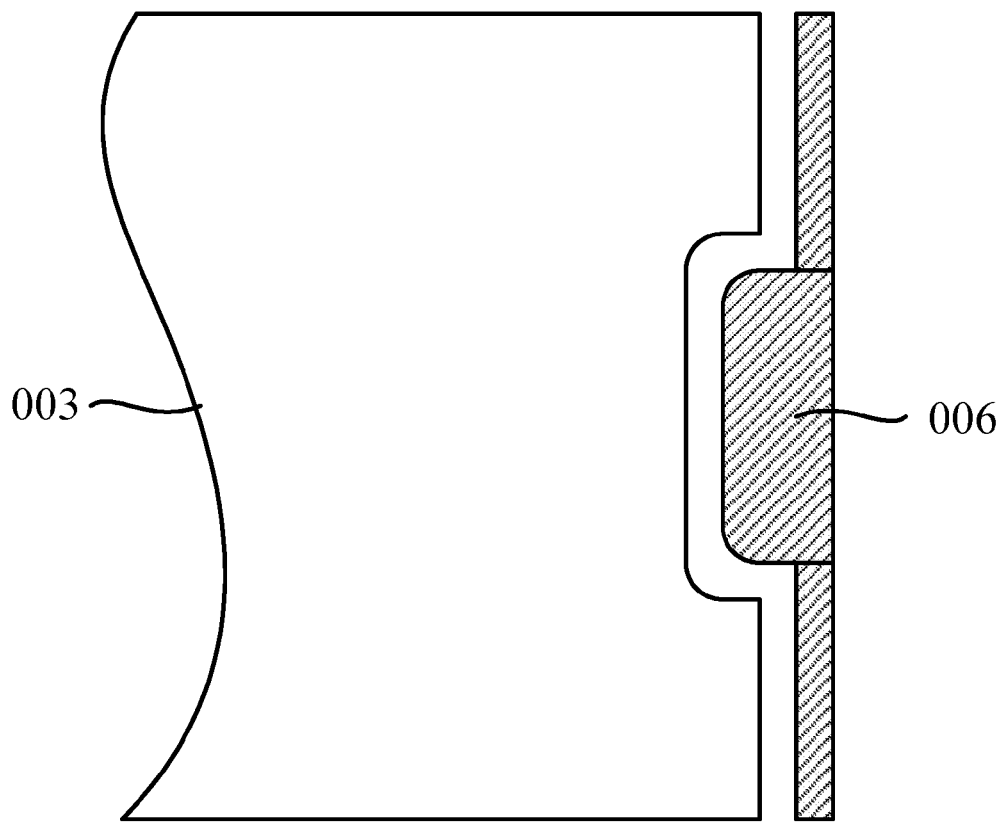
FIG. 2 is a sectional schematic diagram of a backlight module along AA' in FIG. 1.

001—back plate; 002—reflective layer; 003—light guide plate; 004—diffusing layer; 005—module frame; 006—position limit structure; 007—assembling frame; 009—display panel; 10—position limit structure; 1—support plate; 11—fixing element; 2—elastic position limit protrusion; 21—position limit element; 211—columnar body; 212—top surface; 213—fixing groove; 22—elastic element; 3—light guide plate; 31—groove; 4—detachable support element; 5—back plate; 6—reflective layer; and 7—diffusing plate.

DETAILED DESCRIPTION

In order to make objects, technical details and advantages of the embodiments of the present disclosure apparent, the technical solutions of the embodiment will be described in a clearly and fully understandable way in connection with the drawings related to the embodiments of the present disclosure. It is obvious that the described embodiments are just a part but not all of the embodiments of the invention disclosure. Based on the described embodiments herein, one person skilled in the art can obtain other embodiment(s), without any inventive work, which should be within the scope of the present disclosure. Besides, thickness and shapes of films and layers in the drawings do not reflect a real proportion, and the purpose is to schematically illustrate the content of the present disclosure.

Unless otherwise defined, all the technical and scientific terms used herein have the same meanings as commonly understood by one of ordinary skill in the art to which the present invention disclosure belongs. The terms "first," "second," and so on which are used in the description and the claims of the present application for invention disclosure, are not intended to indicate any sequence, amount or importance, but distinguish various components. The terms "includes," "including," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly.

Figure 3:
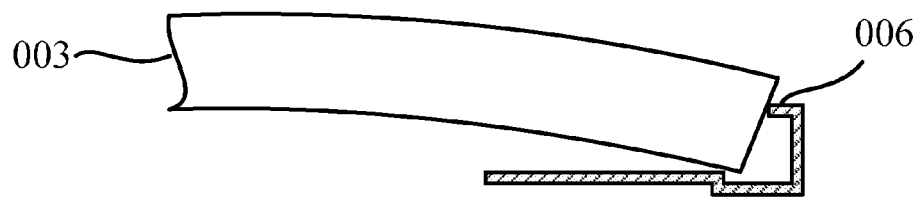
FIG. 3 is a schematic diagram illustrating a curved light guide plate.

During the research, the inventors of the present application have found that: if a gap between a light guide plate and a position limit structure is set relatively large (having a relatively large width), after assembling or during the following transportation process, if it is affected by a shock, a relatively large displacement of the light guide plate may occur at the gap; in this way, a relative strong friction between the light guide plate and the reflective layer therebelow and the light guide plate and the diffusing layer thereon may result in a defect of white spot, so as to influence the image display; if the gap between the light guide plate and the position limit structure is set relatively small (having a relatively small width), during the processes of environmental test of the subsequent modules and environmental reliabilty evaluation after assembling the entire device, or, in a region with relatively high temperature and humidity, thermal expansion of the light guide plate which is affected by the environment may go beyond a preset value of the gap, such that the light guide plate may curve upward or downward; as illustrated by FIG. 3, the light guide plate 003 is affected by the surrounding environment and generates thermal expansion, so as to bend upward. Eventually, the curved light guide plate 003 may push the display substrate above and deform the display substrate, so as to affect the image quality. Besides, defects such as wrinkle may occur on the reflective layer or the like under the light guide plate due to the deformation of the light guide plate.

The present disclosure provides a backlight module and a display device. The backlight module includes a light guide plate and a position limit structure. The position limit structure includes a support plate and an elastic position limit protrusion disposed on the support plate, the elastic position limit protrusion corresponds to a side surface of the light guide plate, the elastic position limit protrusion is configured to generate elastic deformation along a direction perpendicular to the support plate upon being subjected to a pressure from the side surface of the light guide plate. Thus, upon the light guide plate vibrating or expanding, the light guide plate may press the elastic position limit protrusion, and does not directly contact the support surface. In this way, in an aspect, the position limit function on the light guide plate is guaranteed, such that a relatively large displacement of the light guide plate does not occur, and friction between the light guide plate and the reflective layer and/or the diffusing layer does not result in a defect of white spot; in another aspect, the light guide plate is not subjected to too much resistance by the support plate while shifting and does not bend upwards or downwards to result in defects such as deformation.

Hereafter, the backlight module and the display device provided by the present disclosure will be described with reference to the accompanying drawings.

First Embodiment

Figure 4:
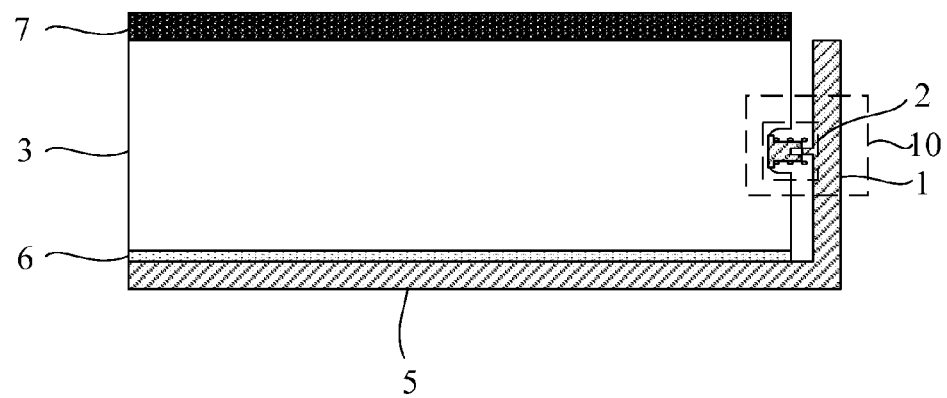
FIG. 4 is a structural schematic diagram of a backlight module provided by an embodiment of the present disclosure.

The present embodiment provides a backlight module, as illustrated by FIG. 4, the backlight module includes a light guide plate 3 and a position limit structure 10. The position limit structure 10 includes a support plate 1 and an elastic position limit protrusion 2 disposed on the support plate 1, the elastic position limit protrusion 2 corresponds to a side surface of the light guide plate 3, that is to say, an orthographic projection of the light guide plate 3 on the support plate 1 covers an orthographic projection of the elastic position limit protrusion 2 on the support plate 1, the elastic position limit protrusion 2 is configured to generate elastic deformation along a direction perpendicular to the support plate 1 upon being subjected to a pressure from the side surface of the light guide plate 3.

Figure 5:
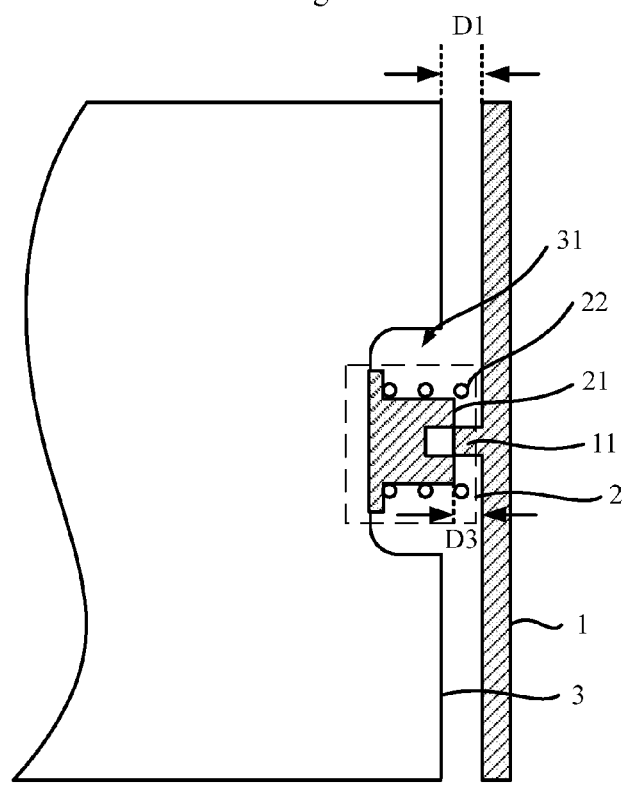
FIG. 5 is a structural schematic diagram of a backlight module provided by an embodiment of the present disclosure, in which a light guide plate does not squeeze a position limit structure.

In the backlight module provided by the present embodiment, the elastic position limit protrusion 2 can play support and position limit functions on the light guide plate 3 upon the side surface of the light guide plate 3 moves toward the elastic position limit protrusion 2 and contacts the elastic position limit protrusion 2. Besides, because the deformation produced by the elastic position limit protrusion 2 upon being subjected to a pressure from the side surface of the light guide plate 3 is elastic deformation, upon the light guide plate vibrating or expanding, the light guide plate may firstly press the elastic position limit protrusion, and does not directly contact the support surface. In this way, in an aspect, the position limit function on the light guide plate is guaranteed, such that a relatively large displacement of the light guide plate does not occur, and friction between the light guide plate and the reflective layer and/or the diffusing layer does not result in a defect of white spot; in another aspect, the light guide plate is not subjected to too much resistance by the support plate and does not bend upward or downward to result in defects such as deformation For example, in the backlight module provided by an exemplary example of the present embodiment, as illustrated by FIG. 5, the side surface of the light guide plate 3 (a side surface of the light guide plate close to the elastic position limit protrusion) is provided with a groove 31, the elastic position limit protrusion 2 corresponds to the groove 31, that is to say, an orthographic projection of the groove 31 on the support plate 1 covers an orthographic projection of the elastic position limit protrusion 2 on the support plate 1, and the elastic position limit protrusion 2 can contact a bottom surface of the groove 31. The elastic position limit protrusion 2 is configured to generate elastic deformation along a direction perpendicular to the support plate 1. Thus, upon the elastic position limit protrusion 2 being subjected to a pressure by the groove 31, the elastic position limit protrusion 2 generates elastic deformation along a direction perpendicular to the support plate 1. Because the elastic position limit protrusion 2 can be disposed in the groove 31, the occupation of length and/or width of the backlight module can be reduced.

For example, as illustrated by FIG. 5, upon the pressure that the elastic position limit protrusion 2 is subjected to being smaller than a preset value, a top surface of the elastic position limit protrusion 2 and a bottom surface of the groove 31 contact with each other, and the side surface of the light guide plate 3 and the support plate 1 have a first distance D1 therebetween. At this time, because the elastic position limit protrusion 2 is elastic, upon the pressure on the elastic position limit protrusion 2 by the light guide plate 3 is relatively smaller (for example, vibrating), the top surface of the elastic position limit protrusion 2 and the bottom surface of the groove 31 contact with each other, and the side surface of the light guide plate 3 and the support plate 1 have a first distance D1 therebetween. In this case, the amount of the elastic deformation of the elastic position limit protrusion 2 is relatively small, the elastic position limit protrusion 2 can paly a position limit function on the light guide plate, and it can be guaranteed that a relatively large displacement of the light guide plate does not occur.

Figure 6:
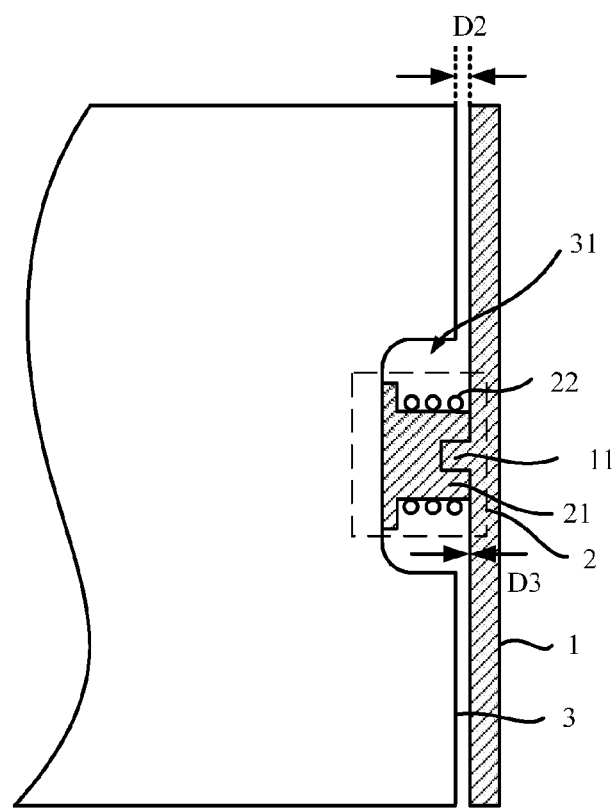
FIG. 6 is a structural schematic diagram of a backlight module provided by an embodiment of the present disclosure, in which a light guide plate squeezes a position limit structure.

For example, as illustrated by FIG. 6, upon the pressure on the elastic position limit protrusion 2 is larger than or equal to the preset value, the top surface of the elastic position limit protrusion 2 and the bottom surface of the groove 31 contact with each other, the side surface of the light guide plate 3 and the support plate 1 have a second distance D2 therebetween, the second distance D2 is smaller than the first distance D1.

For example, as illustrated by FIG. 6, upon the pressure on the elastic position limit protrusion 2 by the light guide plate 3 is relatively larger (for example, expanding), the elastic position limit protrusion 2 generates relatively large elastic deformation, the top surface of the elastic position limit protrusion 2 and the bottom surface of the groove 31 contact with each other, and the side surface of the light guide plate 3 and the support plate 1 have a second distance therebetween. In this case, the light guide plate 3 can squeeze the elastic position limit protrusion 2 while expanding, and does not squeeze the support plate 1, in this way, it can be guaranteed that the light guide plate 3 does not directly contact the support plate 1 and is not subjected to too much resistance to bend upward or downward, or protrude. In this situation, if the elastic position limit protrusion 2 has relatively large elastic potential energy, the bottom surface of the elastic position limit protrusion 2 and the support plate 1 keep a certain distance therebetween, i.e., a third distance D3; if the elastic position limit protrusion 2 has relatively small elastic potential energy, the bottom surface of the elastic position limit protrusion 2 and the support plate 1 may contact with each other (that is, the third distance is zero).

Second Embodiment

On this basis of the first embodiment, the present embodiment provides a backlight module, as illustrated by FIG. 4, the backlight module further includes a back plate 5, the light guide plate 3 is disposed on the hack plate 5, the position limit structure 10 is disposed on an edge of the back plate 5 and corresponds to a side surface of the light guide plate 3. Thus, a position limit function on the light guide plate can be realized by disposing the position limit structure 10 on the back plate 5. It is to be noted that, the back plate in the backlight module provided by the present embodiment can be a circle, an ellipse or other shapes, and can be applied to wearable devices such as watch and wristband. Because the using environment of the wearable devices such as watch and wristband is relatively complicated, and there are many situations being subjected to vibration, the backlight module provided by the present embodiment can largely improve the stability and reliability.

For example, in a backlight module provided by an exemplary example of the present embodiment, the position limit structure 10 is disposed at least one edge of the back plate 5 (in the case that the back plate have a polygon shape), and corresponds to at least one side surface of the light guide plate 3.

For example, in order to conveniently limit the position of the light guide plate, the position limit structure can be only disposed at two wide edges of the back plate (in the case that the back plate have a rectangle shape, the wide edges are edges perpendicular to two longer edge), because the thermal expansion of the longer edge of the back plate is relatively large, the position of the light guide plate can be efficiently limited by disposing a position limit structure at two wide edges which are perpendicular to two longer edges of the back plate, the number of the position limit structures can be reduced, and the costs can be saved. Certainly, the present disclosure includes but is not limited thereto, each of the four edges of the back plate can be provided with a position limit structure.

For example, in a backlight module provided by an exemplary example of the present embodiment, as illustrated by FIG. 4, the support plate 1 is connected to the back plate 5, the support plate 1 is provided with a fixing element 11, configured to keep the relative fixation of the elastic position limit protrusion 2 and the back plate 5 in a direction perpendicular to a direction of elastic deformation of the elastic position limit protrusion 2. Thus, the present embodiment can keep the relative fixation of the elastic position limit protrusion and the back plate, such that a displacement of the elastic position limit protrusion may not occur upon being squeezed by the light guide plate, and the situation that the elastic position limit protrusion cannot perform position limit function on the light guide plate well in the subsequent processes can be avoided.

For example, as illustrated by FIG. 4, the back plate 5 and the support plate 1 have an integrated structure, so as to increase the stability of the support plate.

For example, as illustrated by FIG. 5, the support plate 1 is provided with a fixing element 11, configured to keep the relative fixation of the elastic position limit protrusion 2 and the support plate 1 along a direction perpendicular to a direction of elastic deformation of the elastic position limit protrusion.

Figure 7:
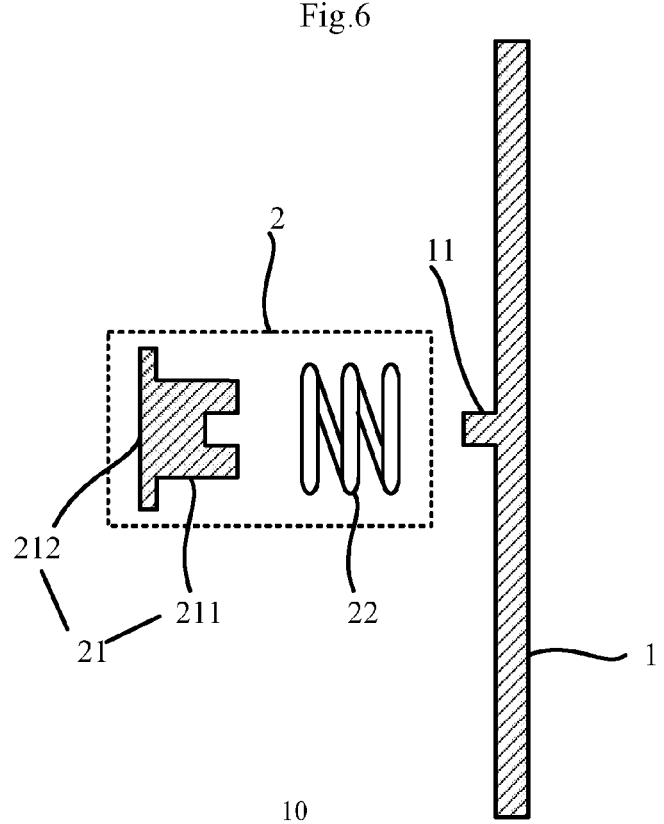
FIG. 7 is a structural schematic diagram of a position limit structure provided by an embodiment of the present disclosure.

For example, in a backlight module provided by an exemplary example of the present embodiment, as illustrated by FIG. 7, the elastic position limit protrusion 2 includes a position limit element 21 and an elastic element 22 which are relatively fixed, the elastic element 22 and the fixing element 11 are relatively fixed along a direction perpendicular to a direction of elastic deformation of the elastic element 22. It should be noted that, the abovementioned relative fixation can be a case where the position limit element and the elastic element are fixed along one direction or some directions, and movable along one direction or some directions. For example, the position limit element and the elastic element can be relatively movable along the direction of elastic deformation of the elastic element, and fixed along a direction perpendicular to the direction of elastic deformation of the elastic element. Thus, the elastic position limit protrusion constituted by the position limit element and the elastic element has a simple structure and is easy to be configured. Besides, a relatively large redundancy can be achieved by disposing two part structures to realize the elastic deformation, so as to provide a bigger space for the elastic deformation. Certainly, the present disclosure includes but is not limited thereto, the elastic position limit protrusion can have an integrated structure, for example, be made of an elastic material.

For example, as illustrated by FIG. 7, the elastic element 22 can be a spring, certainly, other structures can be selected as the elastic element according to the requirements, for example, elastic resin, rubber, sponge, or foam materials.

For example, as illustrated by FIG. 7, the position limit element 21 includes a columnar body 211 and a top surface 212, a diameter of the top surface 212 is larger than an internal diameter of the elastic element 22 (for example, a spring), the elastic element 22 (for example, a spring) is sleeved on the columnar body 211.

In the backlight module provided by the present embodiment, upon being squeezed, the position limit element can keep relative fixation with the spring, so as to sufficiently utilize the elastic deformation space of the spring perpendicular to the support plate.

For example, as illustrated by FIG. 7, the fixing element 11 is a columnar protrusion, an internal diameter of the columnar body 211 is larger than an external diameter of the columnar protrusion, and the columnar body 211 is sleeved on the columnar protrusion. Thus, the present embodiment can keep the relative fixation of the position limit element and the fixing element, to keep the relative fixation of the position limit element, the spring and the support plate, so as to prevent the position limit element and the spring shifting due to the squeezing of the light guide plate, and the situation that the position of the light guide plate cannot be limited well in the subsequent processes can be avoided.

For example, as illustrated by FIG. 5, upon the elastic position limit protrusion 2 not being squeezed, a bottom surface of the columnar body 211 and the support plate 1 have a third distance D3 therebetween, upon the elastic position limit protrusion 2 being squeezed and the pressure being relatively large, the bottom surface of the columnar body 211 and the support plate 1 can contact with each other (that is, the third distance D3 is zero).

In the present embodiment, upon the elastic position limit protrusion not being squeezed, the bottom surface of the columnar body and the support plate have a third distance therebetween. Thus, the elastic position limit protrusion 2 can be provided with a certain space for elastic deformation, so as to provide a certain movable gap to the light guide plate, such that it is convenient for assembling. Upon the elastic position limit protrusion being squeezed by the light guide plate, because the bottom surface of the columnar body and the support plate contact with each other, a further displacement of the light guide plate does not occur, such that a defect of white spot caused by the friction between the light guide plate and the diffusing layer thereon and/or the reflective layer therebelow can be avoided.

Third Embodiment

On the basis of the first embodiment, the present embodiment provides a backlight module, as illustrated by FIGS. 8-11, the backlight module further includes a detachable support element 4, the columnar protrusion has a hollow structure, a diameter of the detachable support element 4 is smaller than an internal diameter of the columnar protrusion. Upon being inserted in the columnar protrusion, the detachable support element 4 is configured to fix the position limit element 21, and a bottom surface of the columnar body 211 and the support plate 1 have a forth distance D4 therebeween.

Figure 8:
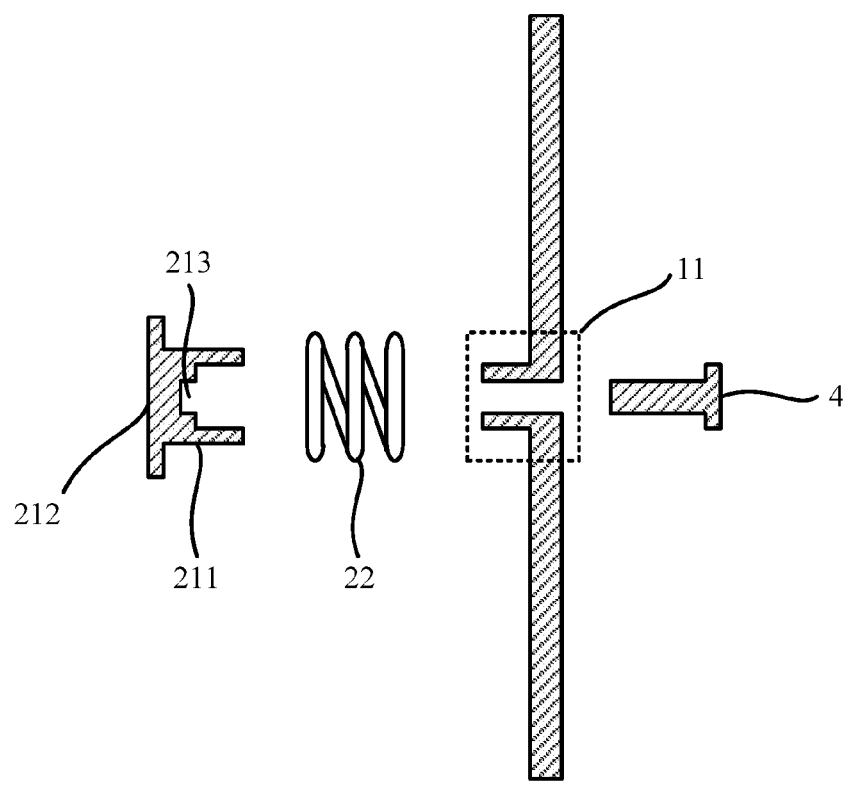
FIG. 8 is a structural schematic diagram of another position limit structure provided by an embodiment of the present disclosure.
Figure 9:
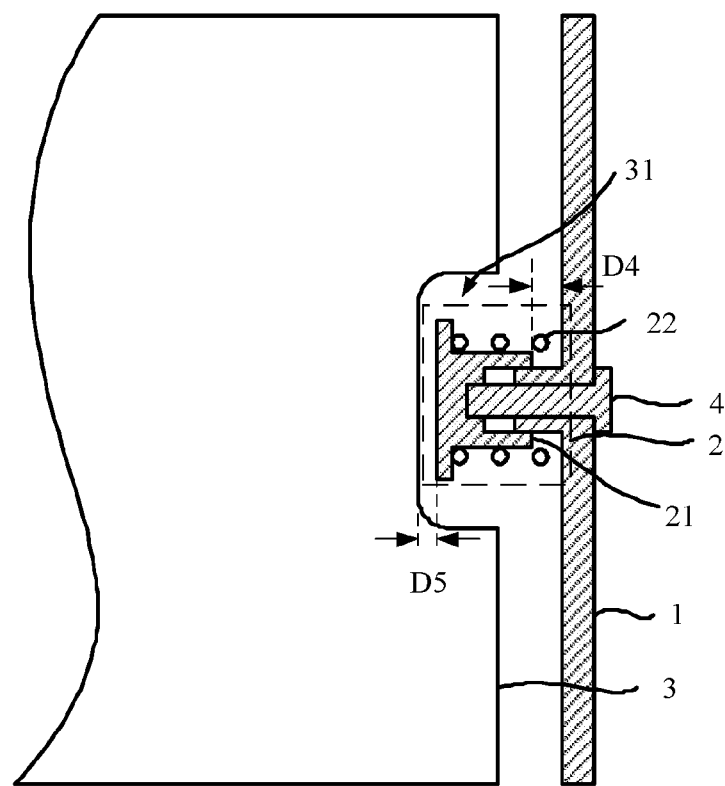
FIG. 9 is a schematic diagram of a detachable support element and an elastic position limit protrusion provided by an embodiment of the present disclosure.
Figure 10:
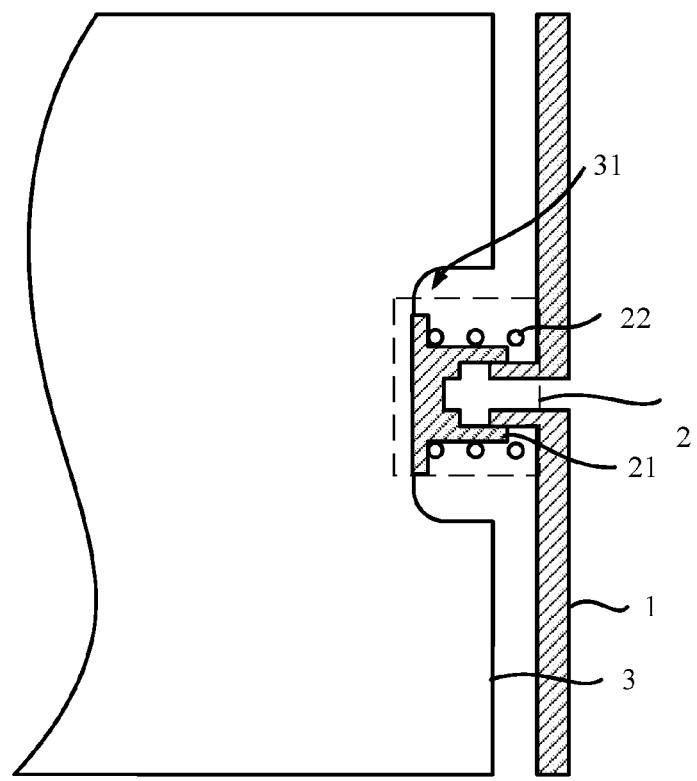
FIG. 10 is a structural schematic diagram of another backlight module provided an embodiment of the present disclosure, in which a light guide plate does not squeeze a position limit structure.

For example, in a backlight module provided by an exemplary example of the present embodiment, as illustrated by FIGS. 8 to 10, an internal top surface of the columnar body 211 is provided with a fixing groove 213. Upon the detachable support element 4 being inserted into the columnar protrusion and supporting the position limit element 21, an end of the detachable support element 4 is fixed in the fixing groove 213, and the top surface 212 and the bottom surface of the groove 31 have a fifth distance D5 therebetween.

The present embodiment can guarantee that the position limit element may not move upon the detachable support element supporting the position limit element, so as to prevent the light guide plate from shifting due to vibration during the assembling processes. A distance between an upper surface of the groove and a bottom surface of the columnar body is equal to a height of the columnar protrusion.

In the present embodiment, the detachable support element can be inserted in the columnar protrusion and the fixing groove during the assembling processes of the backlight module, as illustrated by FIG. 9, for example, the detachable support element 4 can be a screw, and the fixing groove 213 can be provided with a screw thread matching the screw, such that the support position limit element 21 can generate a certain pressure on the spring upon the screw being inserted in the fixing groove 213. The spring is in a compressed state, such that a gap whose width is the fifth distance can be formed between the top surface 212 of the position limit element 21 and the light guide plate 3, so as to provide a certain movable space to the light guide plate during the assembling processes of the backlight module.

For example, a certain movable space can be provided to the light guide plate during the assembling process of the backlight module by disposing the fourth distance D4 as zero or the fifth distance D5 as zero.

Figure 11:
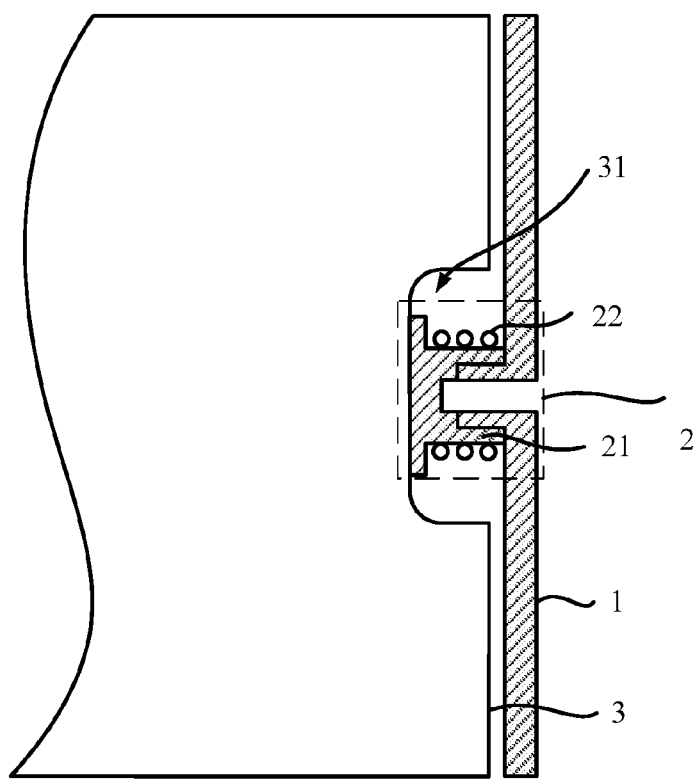
FIG. 11 is a structural schematic diagram of another backlight module provided an embodiment of the present disclosure, in which a light guide plate squeezes a position limit structure.

After assembling, the detachable support element can be withdrawn, the spring is not subjected to the pressure of the position limit element and plays a position function of the elastic position limit protrusion (as illustrated by 10, upon the pressure on the elastic position limit protrusion 2 by the light guide plate 3 being relatively small, a top surface of the elastic position limit protrusion 2 and a bottom surface of the groove 31 contact with each other, the elastic position limit protrusion 2 can play a position limit function on the light guide plate 3 and can guarantee that a relatively large displacement of the light guide plate 3 does not occur) and a function of providing a space for the expansion of the light guide plate (as illustrated by FIG. 11, upon the pressure on the elastic position limit protrusion 2 by the light guide plate 3 is relatively large, the elastic position limit protrusion 2 generates a relatively large elastic deformation, the top surface of the elastic position limit protrusion 2 and the bottom surface of the groove 31 contact with each other, it can be guaranteed that the light guide plate 3 does not directly contact the support plate 1 and protrude or bend upward or downward due to too much resistance).

For example, the detachable support element includes a screw, and thee internal wall of the columnar protrusion and/or the fixing groove are provided with a screw thread matching with the screw. In this way, it is not easy for the detachable support element to fall off upon supporting the position limit element.

Figure 12:
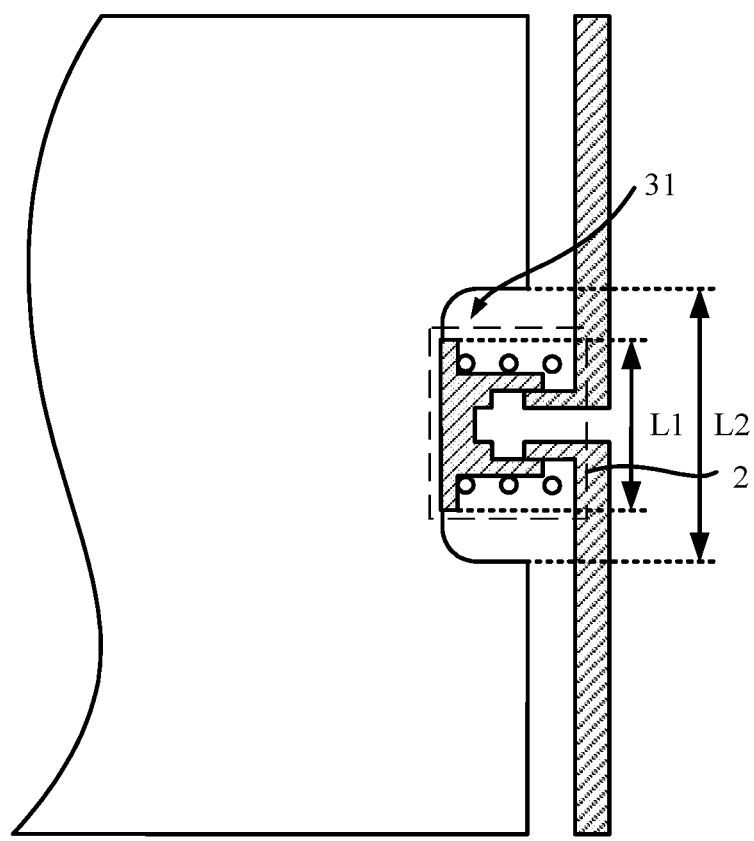
FIG. 12 is a schematic diagram of a length of an elastic position limit protrusion and a length of a groove provided by an embodiment of the present disclosure.

For example, in a backlight module provided by an exemplary example of the present invention, as illustrated by FIG. 12, for example, a length L1 of the elastic position limit protrusion 2 is smaller than a length L2 of the groove. It can be guaranteed that the elastic position limit element can provide a certain space for expansion to the light guide plate along a direction perpendicular to an elastic direction of the spring.

Fourth Embodiment

The present disclosure further provides a display device, including the abovementioned backlight module.

It is to be noted that, the display device in the present embodiment can include: an electronic paper, a cell phone, a flat plate computer, a television, a notebook computer, a digital frame, a navigator and any products or components having a display function.

The technical solutions of the present disclosure are described in detail with reference to the accompanying drawings. In the existing art, upon the light guide plate expanding on heating, the light guide plate is likely to curve or bend and result in display defects. Through the technical solution of the present disclosure, the light guide plate may firstly press the elastic position limiting protrusion upon vibrating or expanding, instead of directly contacting the support surface. In this way, in an aspect, the position limit function on the light guide plate is guaranteed, such that a relatively large displacement of the light guide plate does not occur, and friction between the light guide plate and the reflective layer and/or the diffusing layer does not result in a defect of white spot; in another aspect, the light guide plate is not subjected to too much resistance by the support plate and does not bend upward or downward to result in defects such as deformation.

The foregoing are merely specific embodiments of the disclosure, but not limitative to the protection scope of the present disclosure. The protection scope of the disclosure should be defined by the accompanying claims.

The present disclosure claims the benefits of Chinese patent application No. 201610006894.4, which was filed on Jan. 5, 2016 and is incorporated in its entirety herein by reference as part of this application.

What is claimed is:

1. A backlight module, comprising:
a light guide plate and a position limit structure,
wherein the position limit structure comprises a support plate and an elastic position limit protrusion disposed on the support plate, the elastic position limit protrusion corresponds to a side surface of the light guide plate, and the elastic position limit protrusion is configured to generate elastic deformation along a direction perpendicular to the support plate upon being subjected to a pressure from the side surface of the light guide plate;
wherein the side surface of the light guide plate is provided with a groove, the elastic position limit protrusion corresponds to the groove, and the elastic position protrusion is configured to generate the elastic deformation along the direction perpendicular to the support plate upon being subjected to the pressure from the groove;
wherein a top surface of the elastic position protrusion and a bottom surface of the groove contact with each other, and the side surface of the light guide plate and the support plate have a first distance therebetween upon the pressure that the elastic position limit protrusion is subjected to being smaller than a preset value; and
the top surface of the elastic position limit protrusion and the bottom surface of the groove contact with each other, and the side surface of the light guide plate and the support plate have a second distance therebetween upon the pressure that the elastic position limit protrusion is subjected to being larger than or equal to the preset value, the second distance is smaller than the first distance.

2. The backlight module according to claim 1, further comprising:
a back plate, wherein the light guide plate is disposed on the back plate, the position limit structure is disposed at an edge of the back plate and corresponds to the side surface of the light guide plate.

3. The backlight module according to claim 2, wherein the back plate has a polygon shape, the position limit structure is disposed on at least one edge of the back plate and corresponds to at least one side surface of the light guide plate.

4. The backlight module according to claim 3, wherein the support plate is connected to the back plate, the support plate is provided with a fixing element, configured to keep relative fixation of the elastic position limit protrusion and the back plate along a direction perpendicular to a direction of elastic deformation of the elastic position limit protrusion.

5. The backlight module according to claim 4, wherein the support plate and the back plate have an integrated structure.

6. The backlight module according to claim 4, wherein the elastic position limit protrusion comprises a position limit element and an elastic element which are relatively fixed, the elastic element and the fixing element are relatively fixed along a direction perpendicular to a direction of elastic deformation of the elastic element.

7. The backlight module according to claim 6, wherein the elastic element is a spring, the position limit element comprises a columnar body and a top surface, a diameter of the top surface is larger than an internal diameter of the spring, and the spring is sleeved on the columnar body.

8. The backlight module according to claim 7, wherein the fixing element is a columnar protrusion, an internal diameter of the columnar body is larger than an external diameter of the columnar protrusion, and the columnar body is sleeved on the columnar protrusion.

9. The backlight module according to claim 8, wherein a bottom surface of the columnar body and the support plate has a third distance therebetween upon the elastic position limit protrusion not being pressed, and the bottom surface of the columnar body and the support plate contact with each other upon the elastic position limit protrusion being pressed.

10. The backlight module according to claim 8, further comprising:
a detachable support element,
wherein the columnar protrusion has a hollow structure, a diameter of the detachable support element is smaller than the internal diameter of the columnar protrusion, the detachable support element is configured to fix the position limit element, so as to make the bottom surface of the columnar body and the support plate have a fourth distance therebetween upon being inserted in the columnar protrusion.

11. The backlight module according to claim 10, wherein the fourth distance comprises zero.

12. The backlight module according to claim 10, wherein an internal top surface of the columnar body is provided with a fixing groove, an end of the detachable support element is fixed in the fixing groove, so as to make the top surface of the position limit element and the bottom surface of the groove have a fifth distance therebetween upon the detachable support element supporting the position limit element.

13. The backlight module according to claim 12, wherein the fifth distance comprises zero.

14. The backlight module according to claim 12, wherein the detachable support element comprises a screw, at least one selected from the group consisting of an internal wall of the columnar protrusion and the fixing groove is provided with a screw thread matching with the screw.

15. The backlight module according to claim 1, wherein a length of the elastic position limit protrusion is smaller than a length of the groove.

16. A display device, comprising the backlight module according to claim 1.

* * * * *